Sept. 2, 1969  F. C. KELLY  3,464,539
SCREW CONVEYORS
Filed Jan. 30, 1968
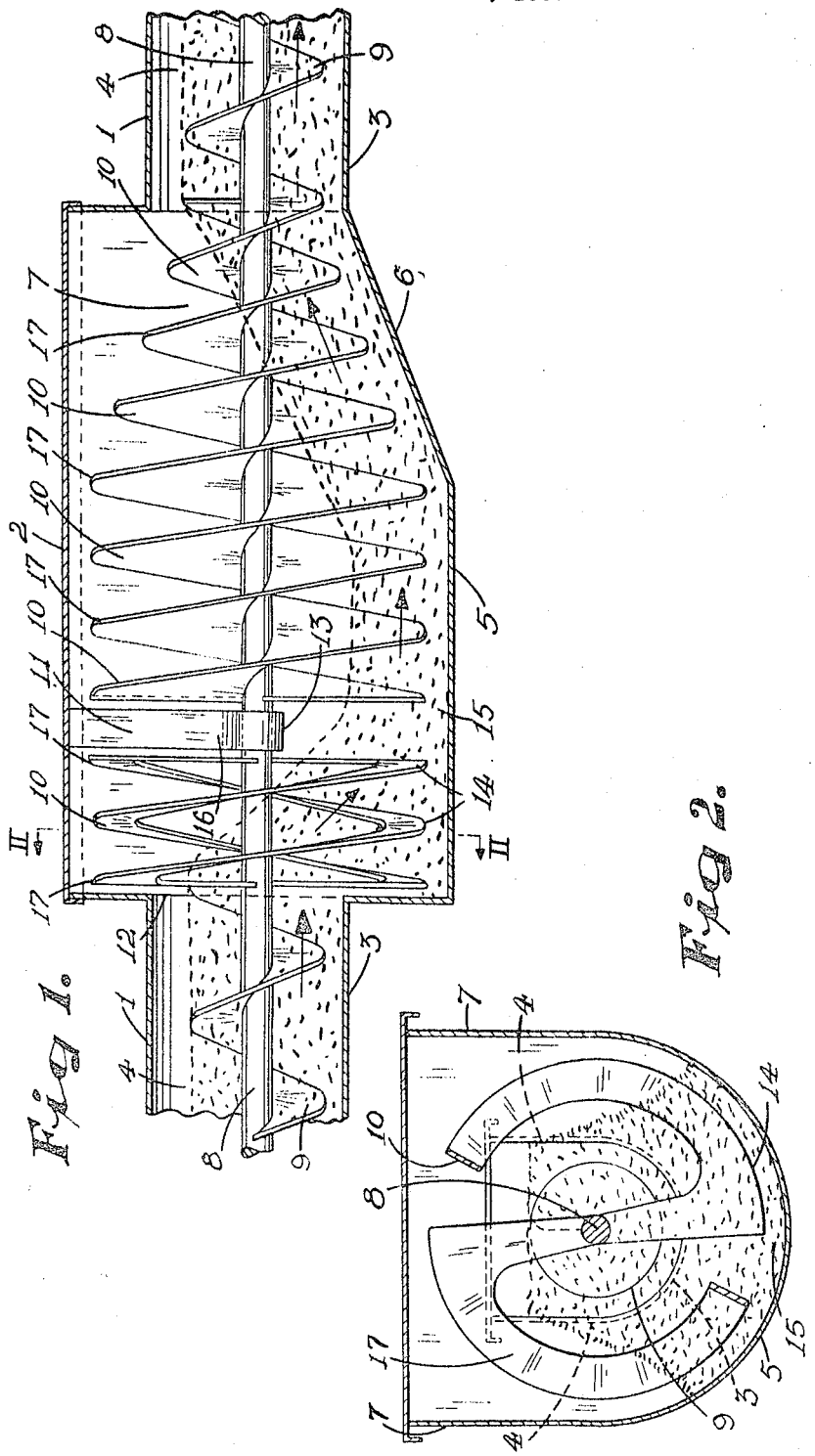

United States Patent Office 3,464,539
Patented Sept. 2, 1969

3,464,539
SCREW CONVEYORS
Frederick Christopher Kelly, Johannesburg, Transvaal, Republic of South Africa, assignor to Fred Kelly and Sons (Proprietary) Limited, Wolhuter, Johannesburg, Transvaal, Republic of South Africa, a company incorporated, Republic of South Africa
Filed Jan. 30, 1968, Ser. No. 701,740
Int. Cl. B65g *33/24*
U.S. Cl. 198—214
9 Claims

ABSTRACT OF THE DISCLOSURE

Screw conveyor apparatus having enlarged housing sections and enlarged screw flights in the enlarged housing sections to permit material being conveyed to pass beneath supports for the screw located in the enlarged housing sections. The size of the latter relative to the normal housing section and the position of a support for the screw in the enlarged housing section are selected to ensure that the material may pass beneath the support without contacting the latter.

---

This invention relates to conveyors.

More particularly the invention is concerned with screw conveyors.

Screw conveyors usually include a housing which is made up of a plurality of sections, and a screw supported within the housing so that on rotation of the screw comminuted material is urged alnog the housing. The screw also comprises a series of connected sections and in the zone where the sections are connected supports or bearings are provided. Supports for the screw are obviously necessary but they comprise an obstruction in the housing and tests have shown a surprisingly high proportion of the total power required for movement of the material is used in moving the material across the zone of the supports. Furthermore the comminuted material, especially when it is of a corrosive character, can cause rapid wear of the bearings. The housing of a screw conveyor is consequently usually run somewhat less than a half bore so that the moving material will not contact the bearings.

It is an object of the invention to provide a conveyor which can be run at capacities much greater than a half bore without the material contacting the bearings.

According to the invention a screw conveyor includes a housing provided with at least one section of enlarged cross-section relative to the normal housing cross-section, a screw having flights of normal diameter in the normal housing section and flights of enlarged diameter in the enlarged section, and at least one hanger support for the conveyor screw located in the enlarged housing section, the arrangement being one in which the extra size of the enlarged housing section together with the spacing of the support from the adjacent end of the normal housing section upstream thereof, and of the lower surface of the support from the extremities of the enlarged flights facilitate the material being conveyed underneath the support.

It will be appreciated that the provision of sufficient space between the support and the adjacent end of the normal housing section upstream of the support so as to cause conveyed material to pass underneath the support is a function of the lateral cross section of the enlarged section as defined between the end of the normal section and leading end of the support. If the lateral distance of the enlarged section transverse the direction of conveyance is sufficiently large that the material can spread laterally then the former distance may be correspondingly smaller. In a preferred form of the invention the distance between the leading end of the support from the end of the normal housing upstream of the support is substantially equal to the diameter of the normal screw flights.

Likewise the provision of sufficient space underneath the lower surface of the support also to enable material conveyed to pass underneath the support is a function of the cross section of the enlarged section below the surface of the support. This is defined by the distance from the lower surface of the support to the extremities of the enlarged flights and the lateral distance transverse this to the sidewalls of the enlarged section. The greater the latter distance the less will have to be the former distance. In a preferred form of the invention the distance between the extremities of the enlarged flights and the lower surface of the support is not less than the diameter of the normal flights.

Also according to the invention the enlarged flights extend to both sides of the support for a distance substantially equal to the diameter of the normal flights and thereafter on the downstream side of the support decrease gradually in diameter to that of the normal flights diameter, the base zone of the enlarged housing section tapering correspondingly to the cross section of the normal housing section.

Further according to the invention the enlarged screw flights on the upstream side of the support are ribboned to facilitate the gravitation of material being conveyed to below the lower surface of the support.

Also in a preferred form of the invention the screw in at least part of the enlarged housing section is provided with a second flight arrangement which is preferably a half cycle out of phase with the first arrangement. Preferably the double flight arrangement extends along the entire length of the enlarged section.

In one arrangement of the invention the pitch of at least part of each flight arrangement in the enlarged section is substantially equal to the normal flight diameter. Alternatively the pitch of at least part of each flight arrangement in the enlarged section is greater than the normal flight diameter. In the latter arrangement the material being conveyed is caused to move more rapidly through this section of the conveyor.

In order to illustrate the invention an example is described hereunder in which

FIGURE 1 is a sectional side view of a part of the screw conveyor, the drawing showing two normal housing sections connected by an enlarged housing section, and FIGURE 2 is a sectional view of the screw conveyor taken along lines 11—11.

A screw conveyor for the movement of comminuted material such as cement or grain includes housing sections 1 of normal cross-section which are connected by housing section 2 of enlarged cross-section. The conveyor may consist of several sections 1 connected in end to end relationship, the sections 1 having interposed between them at regular intervals the enlarged sections 2. In this example of the conveyor the normal housing sections 1 are shown provided with cylindrical base zone 3 and vertical walls 4 to either side of the base zone 3. The leading portion of the enlarged section 2 is shown provided with a cylindrical sump zone 5 while the trailing portion is provided with a conical lifting zone 6, the zones 5 and 6 being connected on either side to the vertical walls 7.

Within the sections 1 of the conveyor is housed a screw 8 having flights 9 of normal diameter. The screw 8 is connected to screw sections having flights 10 of enlarged diameter, these flight sections 10 being located in the housing sections 2 of enlarged cross section. Support for the screw 8 is provided by the hanger support 11 which is located in the enlarged housing section 2.

The arrangement of the components is such that the extra size of the section 2 together with the spacing of the hanger support 11 from the end 12 of the housing section 1, and of the lower surface 13 of the support 11 from the extremities 14 of the enlarged flights 10 facilitate the conveyance of material 15 underneath the support 11.

By having the distance of the leading end 16 of the support 11 from the end 12 of the normal housing section 1 substantially equal to the diameter of the normal flights 9, the material 15 may fall into the sump zone 5 without contacting the end 16 of the support 11. The material 15 is caused to move underneath the lower surface of the support 11 by having the distance between the extremities 14 of the enlarged flights 10 and the lower surface 13 of the support 11 not less than the diameter of the normal flights 9.

The enlarged sections 10 extend to either side of the support 11 for a distance substantially equal to the diameter of the normal flights 9. Thereafter, on the upstream side of enlarged section 2, corresponding to where the conical lifting zone 6 begins to taper towards the normal section 1, the diameter of the enlarged flights 10 tapers towards the diameter of the normal flights 9. Over this area a lifting effort is imparted to raise the material 15 from the sump zone 5 to the normal section 1.

In order to assist in the purpose of the invention and cause the material 15 to flow underneath the support 11, the enlarged flights 10 on the upstream side of the enlarged section 2 are ribboned. This facilitates the gravitation of material 15 to below the lower surface 13 of the support 11. This ribboning of the upstream flights 10 the distance of the hanger support 11 from the end 12 of the section 1 to be made less, if so required.

Movement of the material 15 through the enlarged section 2 of the conveyor is improved by providing the screw 8 in this zone with an additional arrangement of flights 17 along the length of the section 2. The flights 17 are located on the screw 8 such that they are a half cycle out of phase with the first series of flights 10. As the flights 10 taper over the later portion of the downstream side of the enlarged section 2, the flights 17 are caused to taper correspondingly.

In the example of the conveyor illustrated the pitch of flights 10 and 17 are shown to be equal to the diameter of the normal flights 9. However, in a different arrangement of the flights 10 and 17, the pitch of each series is greater than the diameter of flights 9. This results in the more rapid movement of material 15 through section 2 of the conveyor.

In operation the conveyor may be run at full bore in the normal housing sections 1 and the material 15 will act to stabilise the screw 8 thus minimising wear of the bearing forming part of the hanger support 11. The material 15 drops into the sump zone 5 of the housing section 2 and thus avoids the hanger support 11 as the material 15 is urged along by the flights 10 of the enlarged section 2. In the conical zone 6 the material 15 is raised to the normal trough sections 1 for onward conveyance.

It will be understood that not only is there reduced wear on the screw 8 of the conveyor of the invention but the latter also has a greater capacity for movement of material.

Many more examples of the invention exist each differing in matters of detail only from the scope of the invention. For instance, a hanger support may be provided for the conveyor screw which instead of depending downwardly is supported laterally. Also, various cross sections of the housing sections may be provided.

What is claimed is:

1. A screw conveyor including a housing provided with at least one section of enlarged cross-section relative to the normal housing cross-section, a screw having flights of normal diameter in the normal housing section and flights of correspondingly enlarged diameter in the enlarged housing section, and at least one hanger support for the screw located in the enlarged housing section, the support being spaced from the adjacent end of the normal housing section upstream thereof and the lower surface of the support being spaced from the extremities of the enlarged flights to permit material to be conveyed underneath the support in the enlarged housing section.

2. A screw conveyor as claimed in claim 1 in which the distance of the leading end of the support from the end of the normal housing section upstream of the support is substantially equal to the diameter of the normal flights.

3. A screw conveyor as claimed in claim 1 in which the distance between the extremities of the enlarged flights and the lower surface of the support is not less than the diameter of the normal flights.

4. A screw conveyor as claimed in claim 1 in which the enlarged flights of constant diameter extend to both sides of the support for a distance substantially equal to the diameter of the normal flights and thereafter on the downstream side of the support the enlarged flights decrease progressively in diameter to that of the normal flight diameter, the base zone of the enlarged housing section tapering correspondingly to the cross-section of the normal housing section.

5. A screw conveyor as claimed in claim 1 in which the enlarged screw flights on the upstream side of the support are ribboned to facilitate the gravitation of material being conveyed to below the lower surface of the support.

6. A screw conveyor as claimed in claim 1 in which the screw in at least part of the enlarged housing section is provided with an additional flight arrangement.

7. A screw conveyor as claimed in claim 6 in which the additional flight arrangement is a half cycle out of phase with the first flight arrangement.

8. A screw conveyor as claimed in claim 6 in which the pitch of at least part of each flight arrangement in the enlarged section is substantially equal to the normal flight diameter.

9. A screw conveyor as claimed in claim 6 in which the pitch of at least part of each flight arrangement in the enlarged section is greater than the normal flight diameter.

References Cited

UNITED STATES PATENTS 3,251,467   5/1966   Bakke _____ 198—213 X

ROBERT G. SHERIDAN, Primary Examiner